July 21, 1953 A. H. LABASTIE 2,646,520
CLUTCH AND BRAKE MECHANISM FOR DYNAMOELECTRIC MACHINES
Filed Nov. 2, 1951
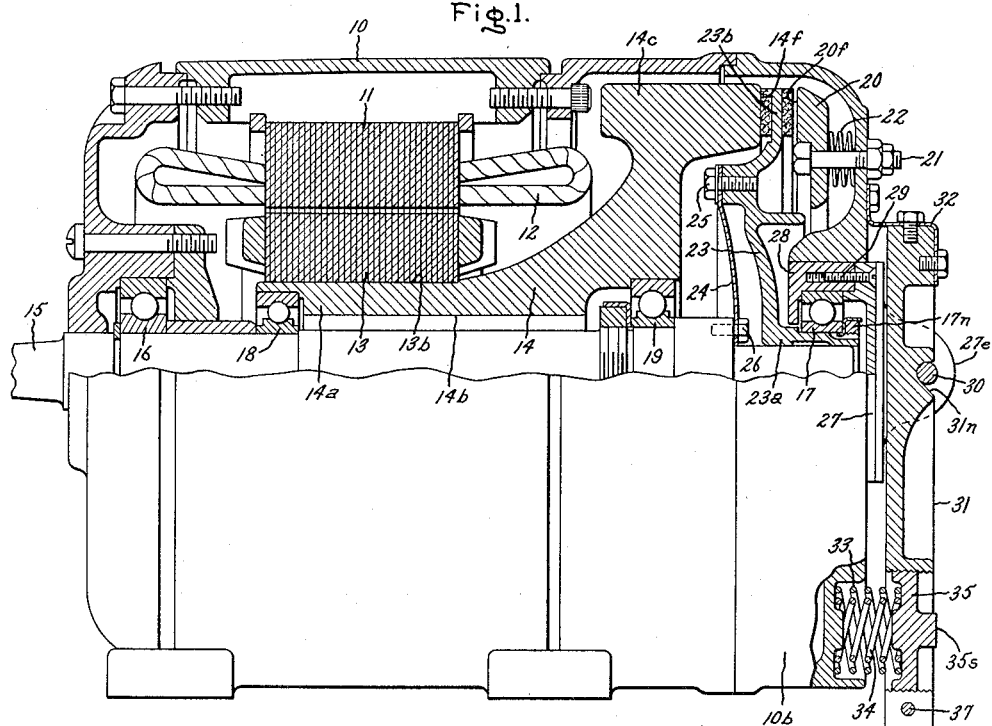
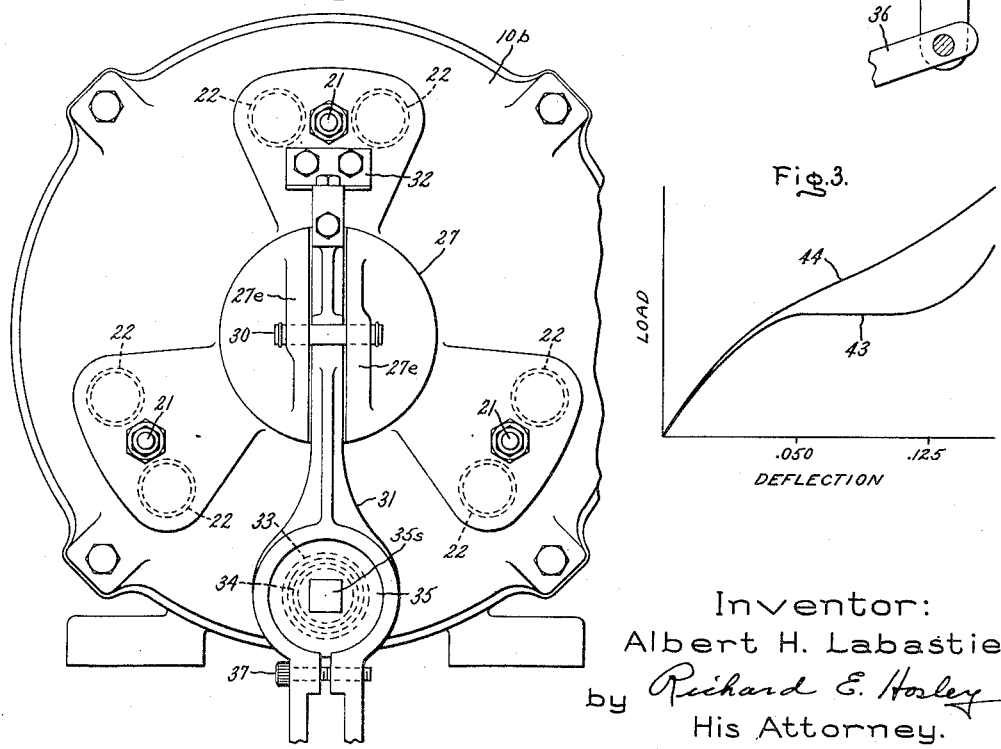
Inventor:
Albert H. Labastie,
by Richard E. Horley
His Attorney.

Patented July 21, 1953

2,646,520

UNITED STATES PATENT OFFICE 2,646,520

CLUTCH AND BRAKE MECHANISM FOR DYNAMOELECTRIC MACHINES

Albert H. Labastie, West Medford, Mass., assignor to General Electric Company, a corporation of New York Application November 2, 1951, Serial No. 254,523

2 Claims. (Cl. 310—76)

My invention relates to clutch and brake mechanisms and has particular significance in connection with a loom motor clutch brake.

In copending application S. N. 187,808, filed September 30, 1950, in the names of Irving Kalikow, L. E. Hildebrand, and A. F. Lukens, and assigned to the assignee of the present invention, there is described and claimed an arrangement where a flywheel is used in conjunction with a driving motor to smooth out load fluctuations. Motor and flywheel run relatively continuously and a driven device is selectively connected to the flywheel through a clutch or alternately stopped by a brake. In accordance with the Kalikow et al. invention, the dynamoelectric machine rotor core is provided with an enlarged inner bore for mounting on an extension of the flywheel which in turn is rotatably mounted as an outer quill shaft upon an output shaft which is rotatably mounted in an outer housing. An advantage of the Kalikow et al. arrangement is that the heavy output drive shaft need not be moved axially in order to selectively obtain clutching or braking action, the latter being accomplished by an axially movable clutch brake wheel secured to the shaft by flexible discs (to provide rotative output of the arrangement) and spring loaded axially with respect to the axially stationary output shaft by a plurality of compression springs to provide clutching action. This spring force is overcome when desired by a lever arrangement to selectively provide braking action. Despite many advantages of such an arrangement over devices of the prior art up to that time, it has been found that in some instances the Kalikow et al. arrangement presents difficulties both in assembly and in operation. For example, the gradient characteristic of the coil springs used for axial loading is not a flat characteristic, so that increasing force has to be used to overcome the effect of the springs with movement thereagainst. Further, this arrangement requires more parts and more complicated parts than is believed necessary in light of the present invention.

It is an object of the present invention to provide simple and inexpensive means for overcoming the above-mentioned difficulties.

A further object of the present invention is to provide an improved clutch brake mechanism utilizing a minimum number of parts, although characterized by a flat gradient spring force on the brake wheel and by a rugged design which simplifies assembly.

The present invention is an improvement on the arrangement of the above-mentioned Kalikow et al. application, preserving all of the advantages of that arrangement, such as little likelihood of failure of bearings, or of shaft, but in the illustrated embodiment of the present invention the means employed for transmitting both axial thrust loading of the brake wheel and torsional drive of the output shaft comprises a single annular member of spring material, such as a dished washer, which is axially yieldingly compressible but circumferentially relatively rigid and has a constant deflection vs. load characteristic. Further, in the illustrated embodiment of my invention, the brakewheel is carried directly on a portion of the shaft, and a simple lever arrangement for pulling the brake wheel against the force of the spring requires only one anti-friction bearing between rotatable and stationary parts.

Other objects and advantages will become apparent and my invention will be better understood from consideration of the following description taken in connection with the accompanying drawing in which Fig. 1 is a side elevational view, partly in section, of a motor, flywheel, clutch and brake in accordance with the present invention; Fig. 2 is an end view of the device of Fig. 1; Fig. 3 is a graphical representation indicating force-deflection characteristic of the dished washer spring shown in Fig. 1.

Referring now to Fig. 1, I have shown an arrangement in which a housing 10 is adapted to hold a conventional dynamoelectric machine stator core portion 11 provided with a stator winding 12. Arranged to react electrodynamically with the stator core portion is a rotor core 13 which is shown as a squirrel cage type rotor conventional except that it is provided with an extra-large inner bore 13b. The dynamoelectric machine may be assumed to be a motor and is provided with a large flywheel 14 having a portion 14a extending within the rotor bore 13b so that the flywheel will be driven from the rotor. Flywheel 14 has an inner bore 14b forming a clearance with an inner drive shaft 15, which acts as the output shaft of the entire mechanism. Shaft 15 is journaled within housing 10 by a pair of antifriction bearings 16 and 17, and the flywheel 14 is journaled upon the shaft by a pair of bearings 18 and 19. Flywheel 14 has a portion 14c extending outwardly from the rotor core and presenting a radially extending annular face 14f which is axially spaced from a radially extending annular face 20f of a relatively stationary brake ring 20 which is adjustable (axially) by a plurality of bolts 21 securing this brake ring 20 to an end of the housing 10 adjustably against a spring bias provided by a plurality of springs 22 (see Fig. 2).

Flywheel annular face 14f forms a clutch facing, as hereinafter will become more apparent, and relatively stationary facing 20f forms a brake facing. Axially slidable upon a portion of shaft 15 is a portion 23a of an annular brake wheel 23 which also has a portion 23b interposed between facings 14f and 20f for selectively providing a braking action and clutching action with movement of the brake wheel one way or the other.

It will be apparent from the drawing that the brake wheel 23 is centered radially by the engagement of its portion 23a with the shaft journaled therein and actually each of these two members tends to support the other, shaft 15 being journaled within the bore of brake wheel 23 portion 23a which, in turn, is journaled in bearing 17 held, as hereinafter will be more fully explained, in end bell 10b of the housing 10. Meanwhile, shaft 15 is held stationary against axial movement with any thrust by the other bearings.

In accordance with the present invention, I provide unitary means acting as a combination axial loading spring (for the brake wheel) and driving disk (for the output shaft) and this means comprises an axially yieldingly compressible, circumferentially relatively rigid member which in the illustrated embodiment is a dished washer 24 provided with flats adjacent its peripheries and held at its outer periphery by a plurality of bolts 25 fastening the outer flat to the brake wheel 23 and held at its inner periphery by a plurality of bolts 26 securing the inner flat to the shaft. It has been known in the past to use a dished-washer or so-called "Belleville" type spring axially held between members at its inner and outer diameters, but, so far as I am aware, such springs have always had their inner and outer diameters restricted only axially (during deflection) and unrestricted radially, circumferentially, and torsionally, the reason being that it was heretofore thought that unless the outer, or inner, diameter was free to move at least radially outwardly or inwardly, the desired spring qualities of the member could not be realized. I have found, however, that such a dished-washer solid type spring may be used to provide both axial loading and torsional driving force as well, thereby to provide a flat gradient (as hereinafter explained) and greatly simplify the design in devices of the character described. In accordance with the illustrated embodiment, the dished-washer spring member is provided with flats adjacent inner and outer diameters, and with drilled holes for accommodating bolts which clamp the dished-washer to the shaft and to the brake wheel. I have found it desirable to make the member of tempered spring steel, and with proper dimensioning, depending, of course, upon the dimensions of the rest of the assembly, it lies within the province of the designer to have this spring provide a flat, or increasing, or decreasing, gradient to completely meet the requirements of the particular application.

The brake-wheel is arranged to be axially movable to selectively secure either braking, or neutral, or clutching action and, as shown in Fig. 1, the dished member spring 24 biases the wheel axially inwardly to provide clutching action. In order to put the brake wheel in the neutral position, or in the braking position (to stop the output shaft), the brake wheel is pulled axially to the right against the force of spring member 24. To this end, end bearing 17 is clamped, as by a nut 17n, to brake wheel portion 23a, and has its outer race held by a two-piece housing comprising an outer bearing cap 27 secured to an inner bearing housing 28, by a plurality of machine screws 29, so that the bearing is solidly clamped within its housing. End cap 27 is provided with a bifurcated end portion providing a pair of ears 27e (see Fig. 2). A pin 30 passes through the ears 27e and is adapted to engage a notch 31n provided in an operating lever 31 which is shown supported at its top end by a flat spring member 32 fastened at one end to the end bell 10b. Adjacent its bottom end, lever 31 is biased away from the housing 10 by a pair of helical springs 33 and 34, respectively, one of which (33) is wound in a left-hand direction and the other of which (34) is wound in a right-hand direction. The springs are wound in opposite directions so that the coils of one will not catch on or interfere with coils of the other.

When the spring force is adjusted as by turning a plug 35 provided with a square end portion 35s for accommodating a wrench or other tool and threadedly engaging a mating bore in lever 31, the tendency to unwind one spring will be counterbalanced by the tendency to wind up the other spring. Also the tendency of one spring to unscrew the adjusting plug 35 will be counterbalanced by the tendency of the other spring to screw it tighter. Operating lever 31 is adapted to be pulled, against the compression spring 33 and 34, closer to the housing by a connecting rod 36 which, in accordance with conventional practice, may be moved (to the right in the drawing) to cause braking action either manually or automatically responsive to some condition on the loom machine which is not shown. With movement of connecting rod 36 to the left, springs 33 and 34 are compressed, notch 31n moves to the left, allowing pin 31 and the associated end cap 27 and bearing 17 and brake wheel 23 to move to the left, the direction in which they are biased by the action of the dished-washer type spring 24, thereby to cause clutching action. With movement of rod 36 to the right, or with release of this operating rod (since the force of springs 33 and 34 will accomplish the same result) notch 31n and pin 30, bearing housing parts 27 and 27,, bearing 17, and brake-wheel 23, will move to the right as the dished-washer spring force is overcome. The force exerted by the coil springs 33 and 34 on the lever arm 31 is readily adjustable so that, for any given force exerted in one direction or the other through the rod 37, the clutch brake mechanism may be made to operate in the one direction or the other. If desired, the mating engagement between pin 30 and notch 31n may be made to show a clearance (between the pin and the notch) when the motor is operating in clutch position, and thus a positive clutch, effected entirely by the action of spring 24, is guaranteed. Once the proper compression of springs 33 and 34 has been obtained by rotating threaded member 35, this threaded member may be positively clamped against further rotation by tightening a locking screw 37 to clamp bifurcated halves of the associated end of lever 31 tightly upon the threaded adjusting member 35.

Referring now to Fig. 3, I have shown a graphical representation of spring force characteristics, load being plotted against deflection. For a dished-washer spring of the type indicated at 23 in Fig. 1 the characteristic is that illustrated by the line 43 which, it will be seen, indicates a flat gradient for a portion of the characteristic, for example, from .05" to .12" deflection. In practice, the spring is made to operate within this flat gradient range and it therefore presents great advantages over more conventional types of springs which, in general, will have an always increasing gradient of force with respect to deflection, as indicated by the line 44. It is, of course, well known that dished-washer type springs which have their inside and outside diameters unrestricted radially are capable of producing a constant gradient over a portion of the deflection range for which they are designed, but it is not so well known that such a spring can be used as a driving disk solidly secured at inner and outer circumferences, and still be made to have a flat or decreasing or increasing gradient entirely at the option of the designer.

With the design of the present invention assembly is simplified, maintenance is simplified, internal springs which are apt to break are eliminated, it is possible to obtain a flat gradient spring force normally biasing the brake wheel in clutching position, the force adapted to overcome this spring force is readily applied with a minimum of parts (including a minimum of bearings), there is a positive clutch force, a consistent and adjustable brake force, and the entire apparatus is very rugged and long-lived.

A dished-washer type spring of the type illustrated at 24 was constructed having a diameter of 6⅜" at outside of outer bolting flat, a diameter of 5³⁄₁₆" at inside of outer bolting flat, a diameter of 2⅛" at outside of inner bolting flat, an inner diameter of .817", a thickness of .038", and a height of dish when unstressed of .1369". This washer was placed under stress and fatigue tested and with maximum internal stress of 100,000 p. s. i. and an axial deflection of .060" excursion, the device survived 5,000,000 cycles, indicating that the design is practical and workable as to both stress and life. In addition, the complete motor clutch-brake assembly of the present invention has been manufactured and tested and despite less hardware in brake wheel and in throw-out cap (all of which accelerates assembly and reduces cost) the results of the tests were more than satisfactory, indicating that there is thus provided a device of the character described, capable of meeting the objects hereinabove set forth.

While I have illustrated and described a particular embodiment of my invention, modifications will occur to those skilled in the art. I desire it to be understood, therefore, that my invention is not to be limited to the particular arrangement disclosed, and I intend in the appended claims to cover all modifications which do not depart from the true spirit and scope of my invention.

What I claim as new and desire to secure by Letters Patent of the United States is:

1. A clutch and brake mechanism for a dynamoelectric machine having a housing, a stator core, a rotor core, and a flywheel having a portion within said rotor core and a portion extending outwardly therefrom and presenting a radially extending annular face axially spaced from a radially extending annular face of said housing, said mechanism having an axially stationary rotatable output shaft journaled within said housing and within said flywheel, an annular brake wheel slidable upon a portion of said output shaft, said brake wheel having a portion disposed between said radially extending annular faces on flywheel and housing to selectively engage one or the other for selectively effecting clutch action and brake action, a dished washer type spring material member secured adjacent one of its peripheries to said brake wheel and secured adjacent another of its peripheries to said shaft for rotatably driving said axially stationary shaft from said brake wheel and simultaneously exerting axial thrust on said wheel with respect to said axially stationary shaft to provide one of said actions, and lever means for pulling said wheel axially against the force of said dished washer spring for effecting the other of said actions.

2. A motor clutch brake device comprising an outer housing, an output drive shaft journaled in said housing, a flywheel member journaled on said drive shaft, a motor rotor mounted on a portion of said flywheel, a motor stator core portion secured within said housing and arranged to react electrodynamically with said rotor to drive said rotor and said flywheel, said flywheel having an annular face, a torsionally stationary, axially adjustable member mounted within said housing and having an annular face spaced from said annular face on said flywheel, a brake wheel centered by having a portion surrounding a portion of said shaft with a sliding fit therebetween, said wheel having a portion interposed between said faces, a dished-washer type spring having an outer flat at which it is solidly secured to said wheel and having an inner flat at which it is solidly secured to said shaft and arranged to urge said brake wheel toward said flywheel annular face for clutch action and to transmit torque from said wheel to said output drive shaft, a bearing surrounding the portion of said wheel surrounding said shaft, a housing for said bearing, a spring biased lever adapted to selectively engage a portion of said bearing housing and overcome the force of said dished-washer type spring and provide braking action or to alternatively provide a clearance with said bearing housing portion thereby to provide said clutching action.

ALBERT H. LABASTIE.

References Cited in the file of this patent

UNITED STATES PATENTS

| Number | Name | Date |
|---|---|---|
| 2,100,464 | Almen | Nov. 30, 1937 |
| 2,104,559 | Hillis | Jan. 4, 1938 |
| 2,387,050 | Bell | Oct. 16, 1945 |
| 2,455,900 | Yardeny | Dec. 7, 1948 |